United States Patent [19]

Hearn et al.

[11] Patent Number: 5,146,122
[45] Date of Patent: Sep. 8, 1992

[54] VOICE COIL ACTUATOR WITH RESILIENTLY MOUNTED SHORTED TURN

[75] Inventors: Anthony R. Hearn, South Wonston; Robert D. Commander, Twyford, both of England

[73] Assignee: International Business Machines Corporation, Armonk, N.Y.

[21] Appl. No.: 603,719

[22] PCT Filed: Mar. 15, 1989

[86] PCT No.: PCT/GB89/00268

§ 371 Date: Nov. 14, 1990

§ 102(e) Date: Nov. 14, 1990

[87] PCT Pub. No.: WO90/10931

PCT Pub. Date: Sep. 20, 1990

[51] Int. Cl.⁵ .................. H02K 41/02; G11B 5/55
[52] U.S. Cl. ........................ 310/13; 310/20; 360/105
[58] Field of Search .............. 310/12, 13, 15, 17, 310/20, 27, 36; 360/105, 106, 107, 109

[56] References Cited

U.S. PATENT DOCUMENTS

| | | | |
|---|---|---|---|
| 3,643,242 | 2/1972 | Bryer | 340/174.1 C |
| 4,144,466 | 3/1979 | Hatch | 310/13 |
| 4,305,105 | 12/1981 | Ho et al. | 360/106 |
| 4,602,175 | 7/1986 | Castagna | 310/13 |
| 4,661,729 | 4/1987 | Hames et al. | 310/13 |
| 4,743,995 | 5/1988 | Castle et al. | 360/98 |
| 4,827,162 | 5/1989 | Morris et al. | 310/13 |
| 4,967,296 | 10/1990 | Wiens et al. | 360/106 |

FOREIGN PATENT DOCUMENTS

| | | | |
|---|---|---|---|
| 0162721 | 11/1985 | European Pat. Off. | |
| 0222139 | 5/1987 | European Pat. Off. | |
| 0239386 | 10/1987 | Japan | 360/105 |
| 2129186 | 5/1984 | United Kingdom | |

*Primary Examiner*—Steven L. Stephan
*Assistant Examiner*—Dennis R. Haszko
*Attorney, Agent, or Firm*—Robert W. Lahtinen

[57] ABSTRACT

A voice coil actuator comprising a carriage assembly and a magnet assembly includes a cylindrical shorted turn resiliently mounted in the magnet assembly. The shorted turn is thereby allowed limited movement in a direction parallel to its own axis. In this way, the reaction force on the magnet assembly, caused by the movement of the carriage assembly during operation of the actuator, can be absorbed by the shorted turn.

4 Claims, 4 Drawing Sheets

VOICE COIL ACTUATOR WITH RESILIENTLY MOUNTED SHORTED TURN

TECHNICAL FIELD OF THE INVENTION

This invention relates to actuator mechanisms of the voice coil motor variety.

BACKGROUND OF THE INVENTION

Voice coil motor actuators are commonly used in magnetic disk file apparatus. The voice coil is attached to a carriage assembly and is located in an air gap defined in a magnet assembly. A number of magnetic read/write heads are mounted on the carriage. A signal, in the form of a current, is supplied to the coil and interacts with the magnetic field set up by the magnet assembly, causing motion of the carriage and therefore of the heads across the surface of disk or disks within the disk file.

The motive force on the carriage results in an equal and opposite reaction force on the magnet assembly, which can excite unwanted resonances in the disk file e.g. in the spindle of the disk motor. This reaction can therefore lead to relative motion between the disk and the read/write heads and to instability in a closed loop head positioning servo system.

The principle of absorbing the reaction force in voice coil motor actuators is well known; IBM Technical Disclosure Bulletin Vol. 19 no. 9 pp 3561-3562 describes an actuator in which the effects of the reaction force are reduced by floating the voice coil motor magnet structure. The magnet structure is supported at both ends by ring flexure assemblies in which a layer of damping material is laminated between two metal sheets. The flexures are mounted onto rigid connector bars which are in turn mounted on the disk file baseplate. In this way, the magnet assembly is effectively isolated from the magnetic disks. U.S. Pat. No. 3 699 555 describes a similar system.

In the design of voice coil motor actuators, it is also common practice to employ a shorted turn, made from a non-magnetic conductive material, to improve the current rise time in the voice coil. European patent application 0 222 139 describes a shorted turn in the form of a copper sleeve which is in contact with the magnet assembly and located in an air gap defined by the magnet assembly. The shorted turn abuts against two rubber rings used as end stops to prevent overtravel of the carriage. U.S. Pat. No. 4 661 729 also describes a cylindrical shorted turn which, in this case, is located on the cylindrical surfaces of two shoulders at the front and rear of the magnet assembly, the shorted turn abutting against one of these shoulders. A seal is formed between the shorted turn and the shoulders by 'O' rings located in two grooves in the shoulders.

DISCLOSURE OF THE INVENTION

While the prior art undoubtedly achieves reduction of the adverse effects of the reaction force by isolating the whole magnet assembly from the rest of the disk file, one drawback with this approach is the consequential increase in size of the disk file. The design of a compact actuator for use in small disk files (e.g. 5.25 inch ) requires a much more compact damping technique.

Accordingly, the invention provides an actuator of the voice coil motor type comprising a coil, a magnet assembly defining an air gap in which the coil is movable on application of a current thereto, a shorted turn, and mounting means for locating the shorted turn in the air gap, characterised in that the shorted turn is located in the air gap clear of the magnet assembly, and is resiliently mounted for movement in a direction parallel to the movement cf the coil.

The principle behind the idea of resiliently mounting the shorted turn to compensate for the carriage reaction is much like the idea used on guns to reduce recoil. Since the shorted turn acts like the secondary of a transformer, any change in current in the voice coil is reflected in the shorted turn but in the opposite direction. The shorted turn being in the same magnetic field thus experiences an equal and opposite force to the carriage. If the shorted turn is fixed in the magnet assembly, the reaction force appears as a stress between the two parts. However, on initiation of coil movement, a resiliently mounted shorted turn moves in the opposite direction to the carriage and hence produces a compensating force to the carriage reaction. The shorted turn, being resiliently mounted, continues to oscillate to a greater or lesser extent and has its own resonant frequency.

It is essential that the design of the shorted turn mounting configuration is such that the value of the mechanical resonant frequency of the shorted turn is smaller than the frequencies of unwanted resonances within the disk file. Given this requirement, the shorted turn mounting configuration can take one of a number of forms, one of which may have an advantage over the others depending on the particular voice coil actuator in which the resilient mounting concept is employed.

In one preferred mounting configuration, the mounting means comprises a resilient material, in contact with both the shorted turn and the surface of the magnet assembly facing the shorted turn, so that the shorted turn is supported away from said surface.

In one preferred option, the mounting means comprises a plurality of resilient bands, the actuator preferably further comprising retaining means for retaining the bands in position.

In another alternative, the retaining means further comprises further grooves, corresponding to the grooves in the shorted turn, located in the surface of the magnet assembly facing the shorted turn. so that the bands are located in both sets of grooves.

In a further alternative, the shorted turn is a cylinder, the magnet assembly includes a surface concentric with the shorted turn and the resilient bands are a pair of 'O' rings.

In another alternative, the retaining means are strips on the surface of the magnet assembly facing the shorted turn.

The shorted turn may be mounted in the magnet assembly in yet another alternative in which the mounting means comprises a pair of diaphragms attached one at each end of the shorted turn and also attached to the magnet assembly acting so as to resiliently support the shorted turn away from the magnet assembly. Alternatively, a plurality of resilient mounts are attached to each end of the shorted turn, the mounts being fixed in the magnet assembly.

The invention will now be described, by way of example only, with reference to the following drawings.

DETAILED DESCRIPTION OF THE INVENTION

Figure 1:
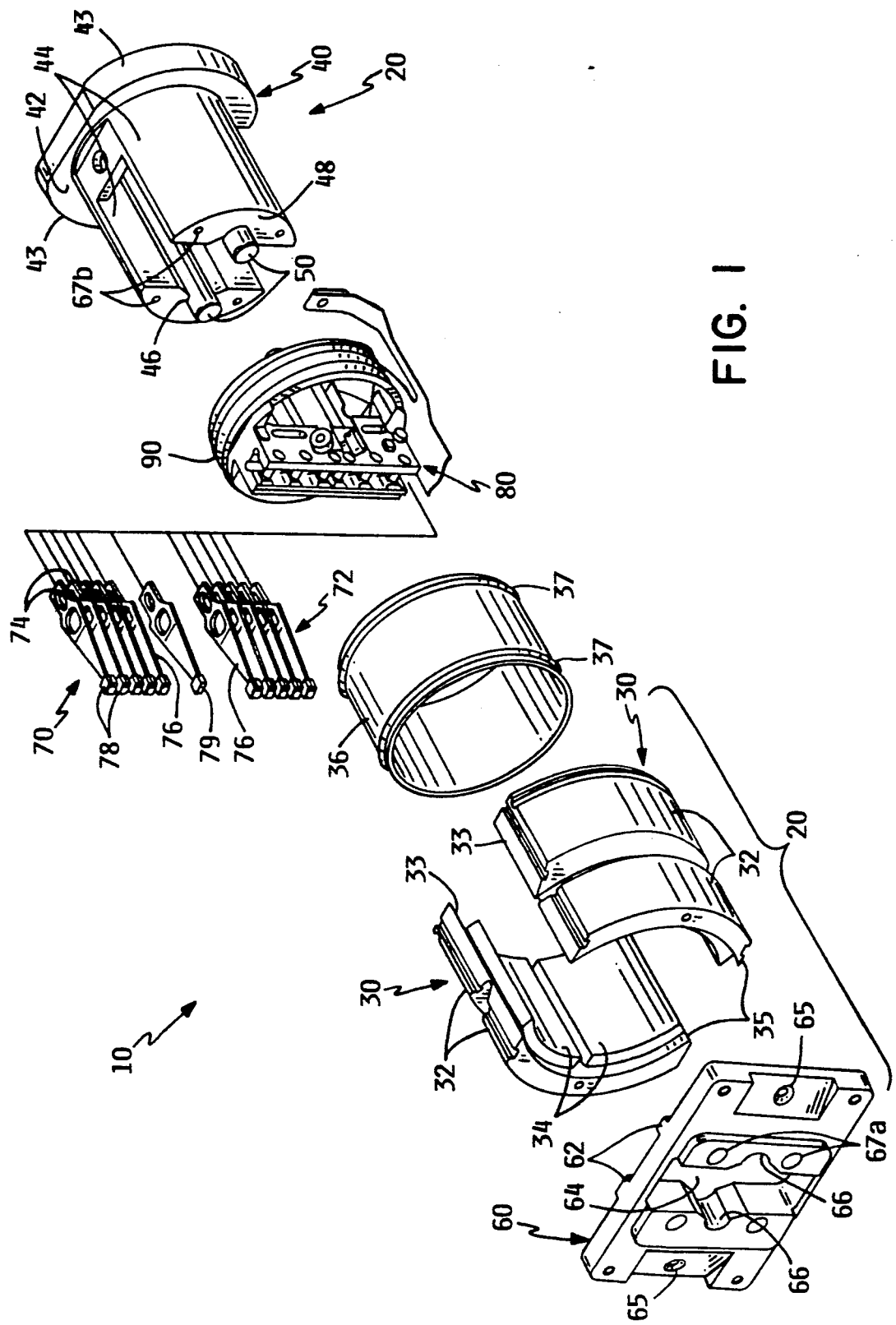
FIG. 1 is an exploded isometric view of the voice coil actuator of the present invention.

The constituent parts of the voice coil actuator 10, are shown in FIG. 1 and include a fixed magnet assembly 20 and a movable carriage assembly 80 supporting a head stack 70.

In a voice coil actuator, a signal in the form of a current is supplied to the coil, the current interacts with the magnetic field set up by the magnet assembly, effecting movement of the carriage and therefore of the attached head stack.

The magnet assembly 20 includes two outer core structures 30 which are formed from four pole pieces 32 with concave inner surfaces which are mounted in pairs on, and bonded to, the convex outer surfaces of two magnet segments 34. The pole pieces overlap the magnet segments at the front and back.

The magnet assembly further includes an iron inner core 40 which is cast in one piece and includes a backing plate 42 substantially circular in cross section with two flat portions to the top and bottom. Projecting from the backing plate are two arms 44 with outer surfaces of substantially the same curvature as the inner surfaces of the magnet segments. The inner surface of each of the arms incorporates a cylindrical groove 46, the grooves running along the length of the arms in parallel relationship. Cylindrical guide rails 50 are fixed into these grooves, such that the front ends of the guide rails extend beyond the front face 48 of the inner core.

The magnet assembly further includes a front plate 60 which functions as a magnetic flux return path, in the same way as the backing plate of the inner core. Incorporated on the back face of the front plate are curved features 62, with essentially the same curvature as the inner surfaces of the outer core pieces. The front plate also includes an aperture 64 which incorporates two cylindrical grooves 66 corresponding to the grooves in the inner core.

The actuator assembly also includes a conductive, non-magnetic cylinder 36, located in the magnet assembly, which acts as a shorted turn.

The head stack 70 is shown in FIG. 1 and consists of ten head/arm assemblies 72 which comprise a rigid arm portion 74 to which is attached two flexures 76 biased away from one another. A slider 78 incorporating a magnetic read/write head is attached to each of the flexures. Also included in the head stack is a head/arm assembly comprising a rigid arm portion to which is attached one end of a flexure. A servo read only head 79 is attached to the other end of the flexure.

The voice coil actuator also includes appropriate means, (not shown in the figures) for limiting the extent of longitudinal travel of the carriage assembly and also a latch for holding the carriage in a fixed position when not in use.

Figure 2:
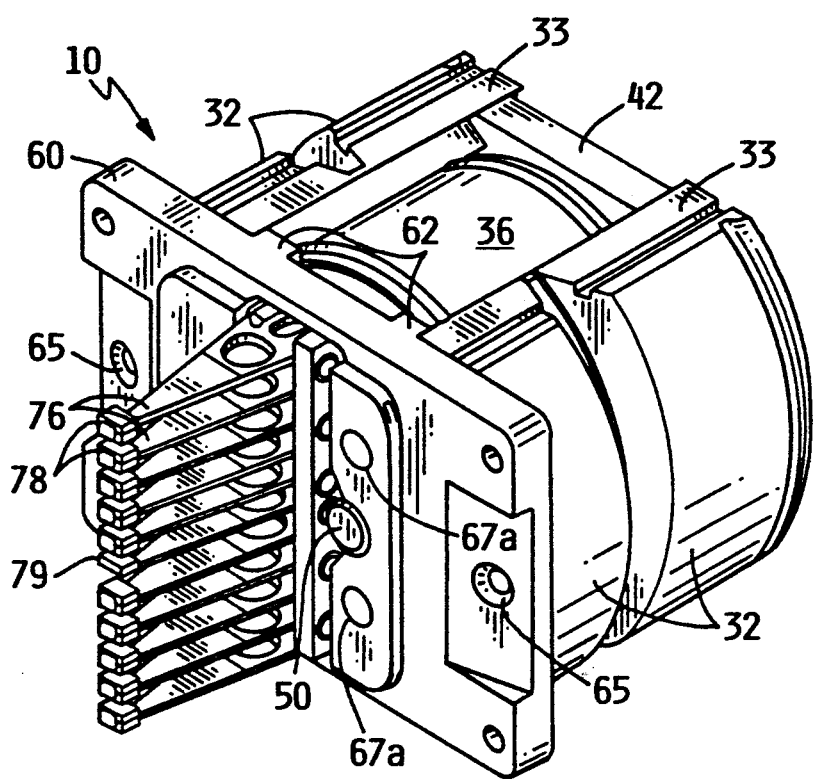
FIG. 2 is an isometric view of the assembled actuator of FIG. 1.
Figure 3:
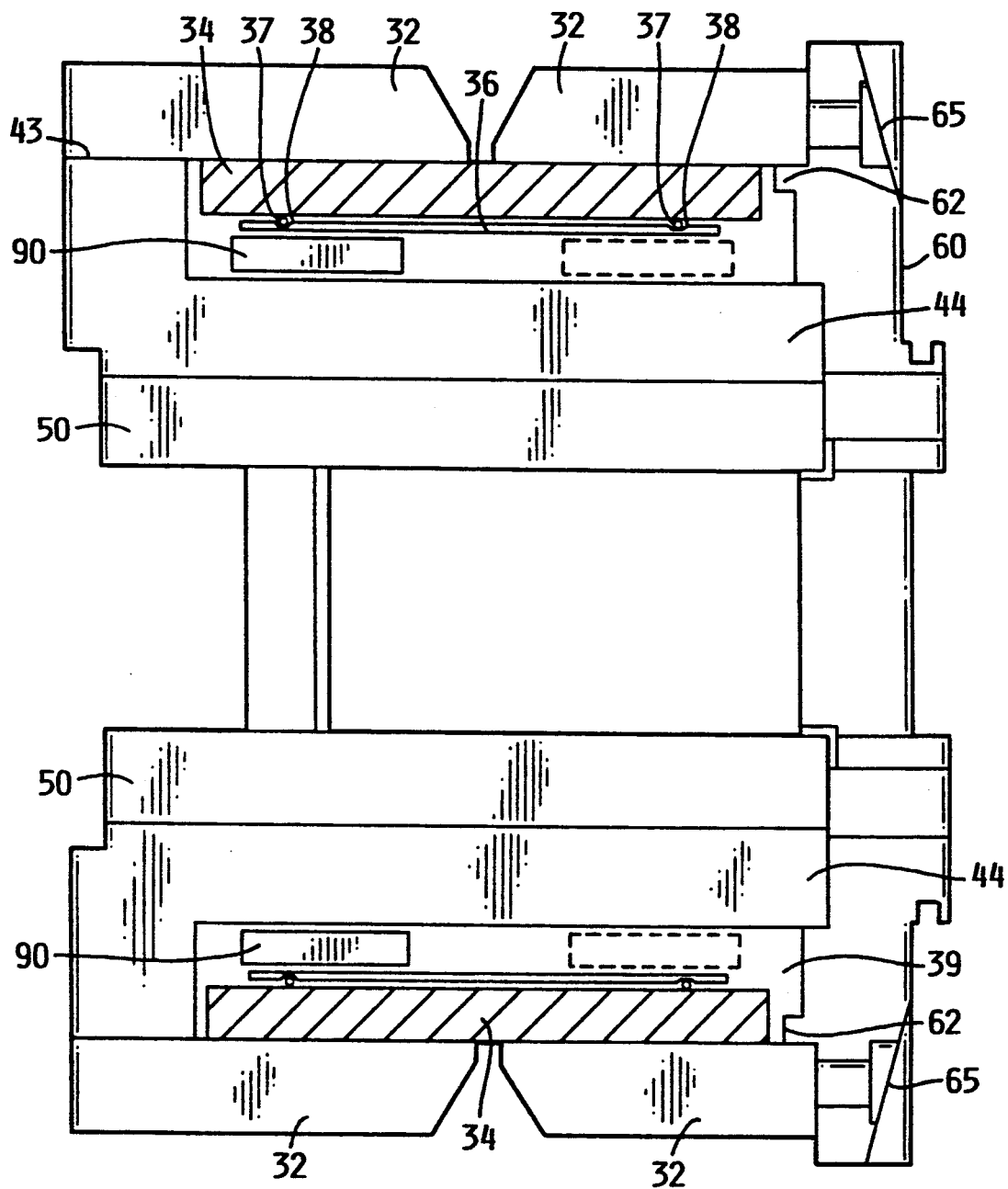
FIG. 3 is a plan view, partially sectioned, of the magnet assembly employed in the actuator of FIG. 2.

The assembled actuator is shown in FIGS. 2 and 3. In the assembled actuator, the tail ends 33 of the pole pieces 32, which extend beyond the magnet segments 34, are in abutting relationship with the curved outer surfaces 43 of the backing plate 42. The forward extensions 35 (shown in FIG. 1) locate on the curved features 62 on the back face of the front plate and are fixed in place by means of two bolts which pass through two holes 65 in the front plate. The shorted turn 36 is mounted in the magnet assembly in close proximity to, but not in contact with, the inner surfaces of the magnetic portions.

The front plate is secured to the arm portions of the inner core by means of screws which pass through four holes 67a in the front plate and into four equivalent holes 67b, two in each of the arms. The front ends of the guide rails locate in the grooves in the front plate.

The carriage assembly 80 fits within the magnet assembly such that the coil 90 wound on the carriage locates in an air gap 39, annular in cross section, which is defined between the inner surface of the shorted turn and the inner core. The bearings mounted on the carriage engage with the two guide rails 50 fixed in the inner core thereby allowing movement in an axial direction. The head stack 70 attached to the carriage assembly extends forwards through the aperture in the front plate.

The shorted turn 36 is resiliently mounted within the magnet assembly; FIGS. 3 and 4 show several mounting configurations.

Figure 4A:
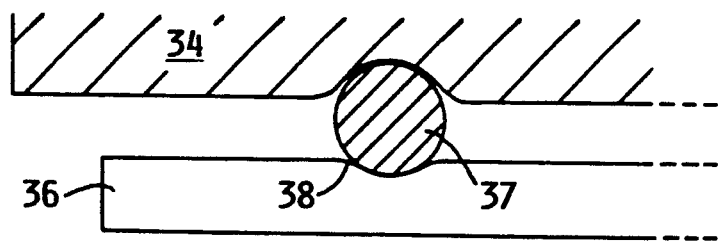
FIGS. 4a, 4b, 4c and 4d are views of a part of the magnet assembly showing alternative shorted turn mounting configurations.
Figure 4B:
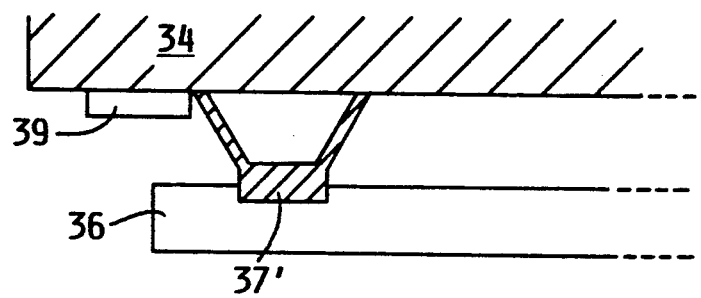

In one embodiment, shown in FIG. 3, the outer surface of the shorted turn incorporates two grooves 38 in which are located two 'O' rings 37. These perform the function of supporting the shorted turn away from the magnet portions at the same time centralizing the shorted turn within the magnet assembly. A similar configuration is shown in FIG. 4a; in this embodiment each 'O' ring is additionally located in grooves in the outer surface of the magnet portion. In another embodiment, shown in FIG. 4b, the 'O' Ring is 'U' shaped in cross section 37'. Retainers 39 (one is shown in FIG. 4b) in the form of metal strips are attached to the outer surface of the magnet portion in a position acting to reinforce the resiliency of the 'O' rings i.e. to ensure that the shorted turn returns to its original position after movement.

Figure 4C:
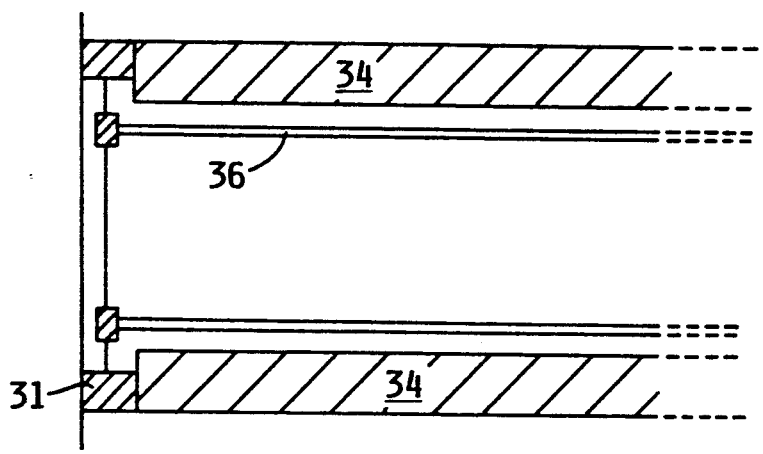

In another mounting configuration, a portion of which is shown in FIG. 4c, each end of the shorted turn is attached to a diaphragm 31, made of a material such as a plastic or polyamide. The diaphragms are attached to the magnet arm in the space between the rear of the magnet portion and the backing plate 42 and, in the space between the front of the magnet portion and the rear of the front plate. The diaphragms centralize the shorted turn within the magnet assembly while allowing limited movement in an axial direction. In addition, this type of mount inhibits any rotational movement of the shorted turn.

Figure 4D:
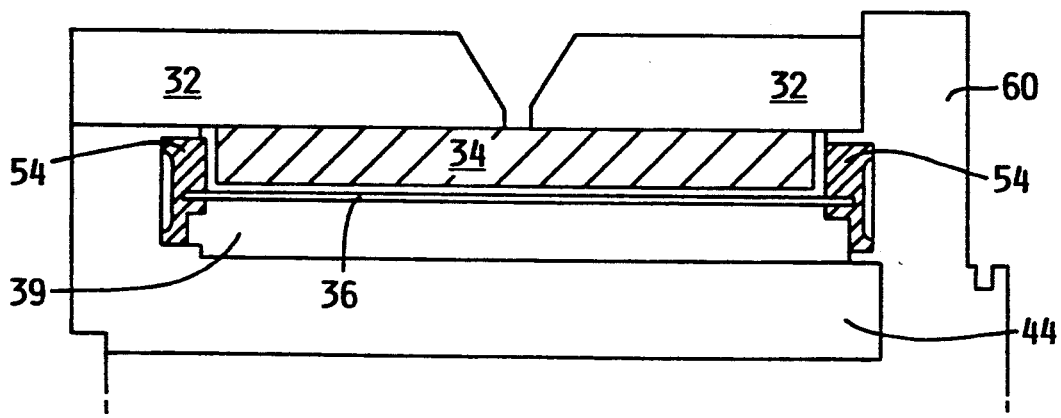

FIG. 4d shows another end mounting scheme; the mount comprises 4 rubber bushes 54 equispaced at each end (the figure shows a section through one bus at each end of the shorted turn), located front and back in the front plate and backing plate respectively. The bushes locate the shorted turn both radially and rotationally and provide the spring for the axial resonance.

While the invention has been described with reference to a linear voice coil actuator, the concept of resiliently mounting the shorted turn is equally applicable to rotary voice coil actuators.

We claim:

1. An actuator of the voice coil type comprising a coil (90), a magnet assembly (20) defining an air gap (39) in which the coil is movable on application of a current thereto, a shorted turn (36), and mounting means for locating the shorted turn in the air gap, characterized in that:

the shorted turn is located in the air gap clear of the magnet assembly, and is resiliently mounted for movement in a direction parallel to the movement of the coil;

said mounting means comprising a plurality of resilient bands in contact with the shorted turn and the surface of the magnet assembly facing the shorted turn, so that the shorted turn is supported away from said surface; and retaining means for retaining the resilient bands in position further comprising grooves in one surface of the shorted turn in which the resilient bands are located.

2. An actuator as claimed in claim 1, wherein the retaining means further comprises further grooves, corresponding to the grooves in the shorted turn, located in the surface of the magnet assembly facing the shorted turn, so that the bands are located in both sets of grooves.

3. An actuator as claimed in claim 1, wherein the shorted turn is a cylinder, the magnet assembly including a surface concentric with the shorted turn and the resilient bands being a pair of 'O' rings.

4. An actuator as claimed in claim 1, wherein the mounting means comprises a pair of diaphragms attached one at each end of the shorted turn and also attached to the magnet assembly acting so as to resiliently support the shorted turn away from the magnet assembly.

* * * * *